United States Patent [19]

Pommerening et al.

[11] 3,927,273

[45] Dec. 16, 1975

[54] JUNCTOR MEMORY

[75] Inventors: Uwe A. Pommerening, Webster; Glenn L. Richards, Caledonia, both of N.Y.

[73] Assignee: Stromberg-Carlson Corporation, Rochester, N.Y.

[22] Filed: June 13, 1974

[21] Appl. No.: 478,960

[52] U.S. Cl. .............................................. 179/18 J

[51] Int. Cl.² .......................................... H04Q 3/56

[58] Field of Search ...................... 179/18 EB, 18 J

[56] References Cited

UNITED STATES PATENTS

| | | | |
|---|---|---|---|
| 3,385,932 | 5/1968 | Masure et al. | 179/18 EB |
| 3,601,546 | 8/1971 | Lee | 179/18 EB |
| 3,678,206 | 7/1972 | Dupieux et al. | 179/18 J |
| 3,772,663 | 11/1973 | Shaver | 340/174 M |
| 3,825,690 | 7/1974 | Kelly et al. | 179/15 AT |

*Primary Examiner*—Thomas W. Brown
*Attorney, Agent, or Firm*—Donald R. Antonelli; William F. Porter, Jr.

[57] ABSTRACT

An electronic private automatic branch exchange includes a digit decoder, a hold register, a line selector, a plurality of junctors and a junctor memory, the junctor memory having a plurality of storage locations each capable of storing data relating to line circuits to be connected to a junctor assigned to the particular storage location. A data select circuit is responsive to a control signal derived from a logic control circuit which receives common control command to selectively gate data from one of the digit decoder, hold register or line selector to a storage location of the junctor memory. The junctor memory includes a plurality of memory chips which are sequentially scanned, but may be randomly accessed.

10 Claims, 10 Drawing Figures

JUNCTOR MEMORY

The present invention relates in general to telephone systems, and more particularly to an electronic private automatic branch exchange.

In our copending application Ser. No. 431,928, filed Jan. 9, 1974, there is disclosed an electronic private automatic branch exchange which is built around a space-divided rectangular solid state switching matrix. One side of the switching matrix provides line appearances which are connected to line circuits, tone receivers, senders and operator loops. The other coordinate side of the matrix provides junctor appearances for connection to an attendant junctor, local junctors and trunk junctors. The solid state switching matrix is a single stage matrix providing direct connection between line appearances and junctor appearances by closing of a single crosspoint, while connection between lines within the system is effected simply by the interconnection of a pair of crosspoints associated with the respective lines and a selected junctor.

In the system disclosed in the above-mentioned copending application, the junctors and the lines are constantly scanned by the common control, and as each line or junctor is addressed, the crosspoints associated therewith are addressed in such a manner that they are either open or closed as required. In this way, the crosspoints in the solid state switching matrix are constantly controlled in a positive manner by appropriate control signals derived from the common control to ensure that the crosspoints associated with the particular junctor and line or lines are closed or open as required. The present invention relates to a junctor memory system which is utilized in the scanning of the junctors.

The control over the connection of common equipment in a telephone system is typically performed by addressing the equipment itself, such as by application of connection signals thereto. In this regard, connection of one of a plurality of common circuits, such as junctor circuits, is commonly performed by operating relays within the circuit. However, such physical scanning of the common circuits to achieve operation thereof is complicated and time consuming. In accordance with the present invention, a junctor memory circuit is provided having a storage location for each junctor circuit in the system. A clock generates distinct junctor time slots with each junctor time slot being subdivided into junctor slots for individual control functions. The system steps continuously in its scan of all junctors by sequentially addressing the junctor time slots in the junctor memory, rather than physically addressing the individual junctor circuits themselves. In this way, the junctors can be scanned very rapidly and the crosspoints in the switching network which must be closed to connect the junctors to a line circuit, which is determined by the data stored in the junctor slot assigned to a particular junctor, can be easily determined.

The junctor time slots assigned to each junctor are capable of storing both a calling and a called line number so that the crosspoints in the switching matrix associated with the particular junctor and the lines to which it must be connected can be determined in a very simple and rapid manner. Thus, both the scanning of the junctors and the addressing of the appropriate crosspoints associated with each junctor in a recurring time frame can be accomplished. In each junctor time, any calling or called line circuit associated with the junctor is addressed to obtain therefrom on a common bus signals indicating the condition of the line from which the status of the line and request for service can be decoded. At the end of each complete scan of the junctor times in the junctor memory, the line scanner in the system addresses a single one of the line circuits to determine whether a request for service is present, the line scanner stepping to the next line circuit at the end of each complete scan of the junctor times.

Based upon the line and junctor scans, the system works to allot a local junctor to any line going off-hook and a status circuit maintains a record of the state of that line circuit in the junctor time slot associated with the particular junctor. In accordance with the state of the call, the common control circuits step the status of the particular line circuit from one program to the next until a communication connection is established from the line circuits through the switching matrix either to another line, the operator, or to an outgoing trunk.

The basic principle of the junctor memory in accordance with the present invention to achieve a constant scanning of the junctors is that of a recirculating system. Common devices for recirculating memories are delay lines or shift registers; however, such conventional devices do not provide the flexibility necessary to also achieve random operation where necessary within the system. Accordingly, the present invention is based upon the use of memory chips which are randomly addressable. A memory address control system recirculates the addresses of the memory in a recirculating fashion, simulating a delay line or a shift register operation. However, by providing the possibility of random addressing of the junctor positions in the memory, it is possible to more simply and quickly alter information in a write mode, or extract information in a read mode from a junctor or a memory address which is not currently in the operation position of the recirculating cycle. This possibility of randomly addressing the memory gives this type of a control system a completely new dimension, basically saving time and equipment.

It is therefore an object of the present invention to provide a telephone system which makes possible the saving of time and equipment in the control of the junctor circuits.

It is a further object of the present invention to provide a junctor control arrangement for an electronic private automatic branch exchange in which the availability and status of the junctor circuits is indirectly determined from information derived in a junctor memory.

It is another object of the present invention to provide a junctor control arrangement for an electronic private automatic branch exchange which makes possible a random addressing of junctor memory positions in a basic recirculating memory system to faciliate the altering of data and extracting of information in the memory.

These and other objects, features, and advantages of the present invention will become clear from the following detailed description of a preferred embodiment of the invention presented in connection with the accompanying drawings, wherein:

FIGS. 1*a* and 1*b*, in combination, form a schematic block diagram of the electronic private automatic branch exchange of the present invention;

FIGS. 2*a*, 2*b*, and 2*c* are waveform diagrams indicating various timing and control signals which appear in the system;

THE BASIC SYSTEM

An electronic private automatic branch exchange in which the present invention may be incorporated includes a switching matrix 10 formed by integrated circuit techniques of a plurality of solid state crosspoint switches of the type disclosed in the aforementioned copending application Ser. No. 431,928. The matrix 10 is a single stage rectangular array of crosspoints divided into three sections, i.e., a line matrix section, a service matrix section and a tone matrix section, as seen in FIG. 1. The matrix serves to establish a low impedance electrical path for passing audio signals between a selected one of a plurality of input leads and a selected one of a plurality of output leads.

Figure 1A:
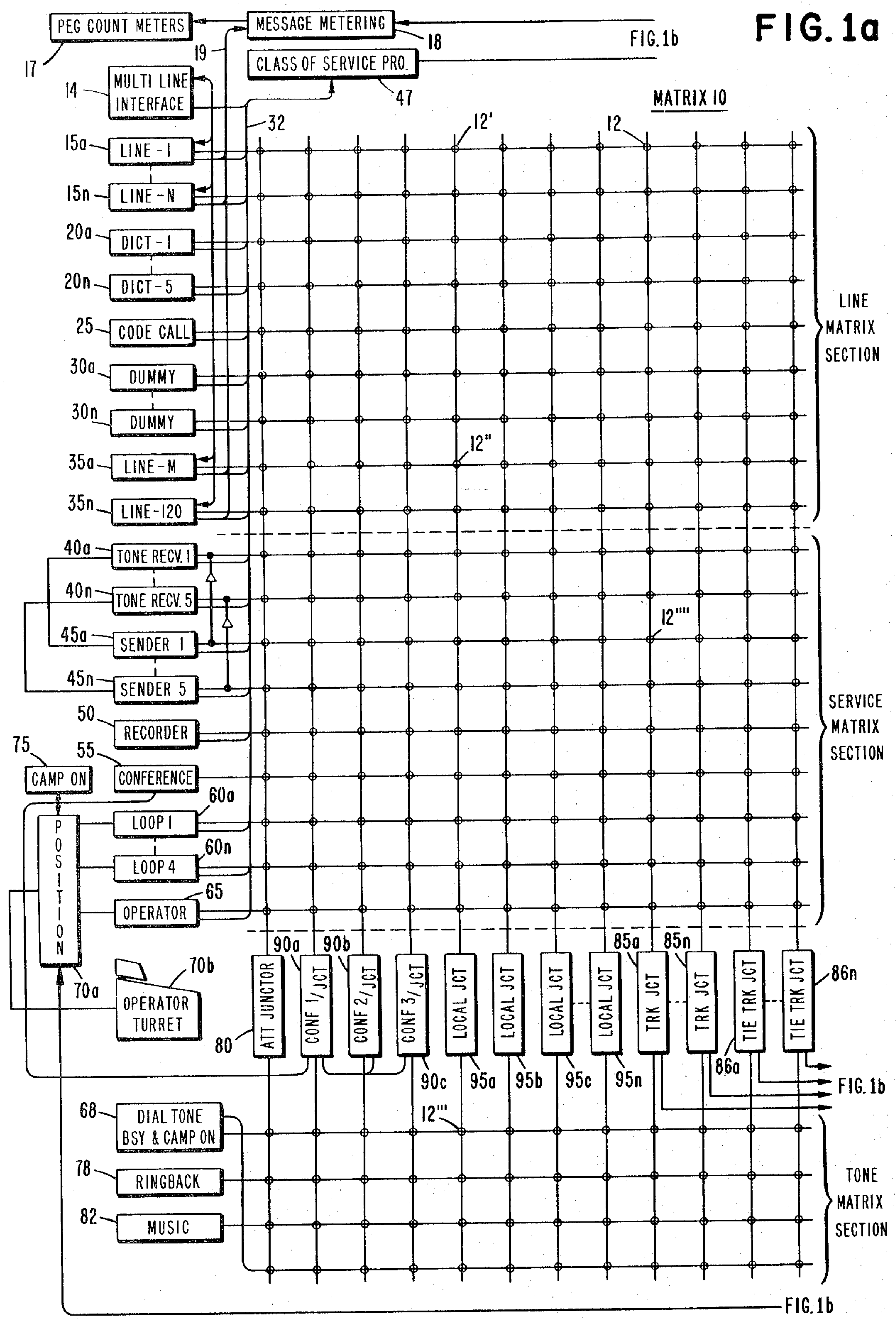

Line appearances are provided on the left side of the line matrix section, as seen in FIG. 1*a*, including a plurality of line circuits 15*a* through 15*n* and 35*a* through 35*n*. Between the line circuits there are provided connections to special lines which take the place of regular lines in the system. These special lines are dictation access circuits 20*a* through 20*n*, a code call circuit 25 and a plurality of dummy line tie trunks 30*a* through 30*n*.

Line appearances at the service matrix section take the form of a plurality of tone receivers 40*a* through 40*n*, a plurality of register senders 45*a* through 45*n*, an intercept recorder 50, a conference bridge 55, a plurality of operator loop circuits 60*a* through 60*n* and an operator line circuit 65. The number of tone receivers, register senders and operator loop circuits, like the number of line circuits connected to the line appearance inputs of the matrix 10 depend upon the traffic requirements and size of the system.

The outputs of the matrix 10 are provided in the form of a plurality of junctor appearances. The junctor appearances are associated with an attendant junctor 80, a plurality of conference junctors 90*a* through 90*c*, a plurality of local junctors 95*a* through 95*n*, a plurality of trunk junctors 85*a* through 85*n* and a plurality of tie trunk junctors 86*a* through 86*n*. The trunk junctors 85*a* through 85*n* are connected to corresponding trunks 89*a* through 89*n*, and the tie trunk junctors 86*a* through 86*n* are associated with corresponding tie trunks 87*a* through 87*n*.

The tone matrix section of the matrix 10 provides inputs on respective lines from a combined dial tone generator and busy-campon tone generator 68, along with inputs from a ring-back tone generator 78 and music source 82. The outputs of the tone matrix section are connected through the respective junctors to the junctor appearances of the line and service matrix sections of the matrix 10.

The operator complex includes in addition to the loop circuits 60*a* through 60*n* and the operator line circuit 65, an operator position circuit 70*a* to which is connected an operator turret 70*b*. A campon circuit 75 providing a special feature in the system is also connected to the operator position circuit 70*a*. As another special feature of the system, a message metering circuit 18 and one or more peg count meters 17 are associated with the line circuits via a bus 19.

The matrix 10 functions to selectively connect an input from a line to a selected junctor by closing the appropriate crosspoint and to provide an appropriate tone through the selected junctor to the line by closing the appropriate crosspoint in the tone matrix section. Connection from one line to another line is also effected by closing the pair of crosspoints in the line matrix section associated with the respective lines and a common junctor.

The matrix 10 is designed to carry only the audio communication between lines or between a line and a trunk. The signaling associated with the establishment of the communication connection through the matrix 10 is handled outside of the matrix via a common bus 32 through a class of service programmer 47 connected to the common control equipment 100.

Figure 1B:
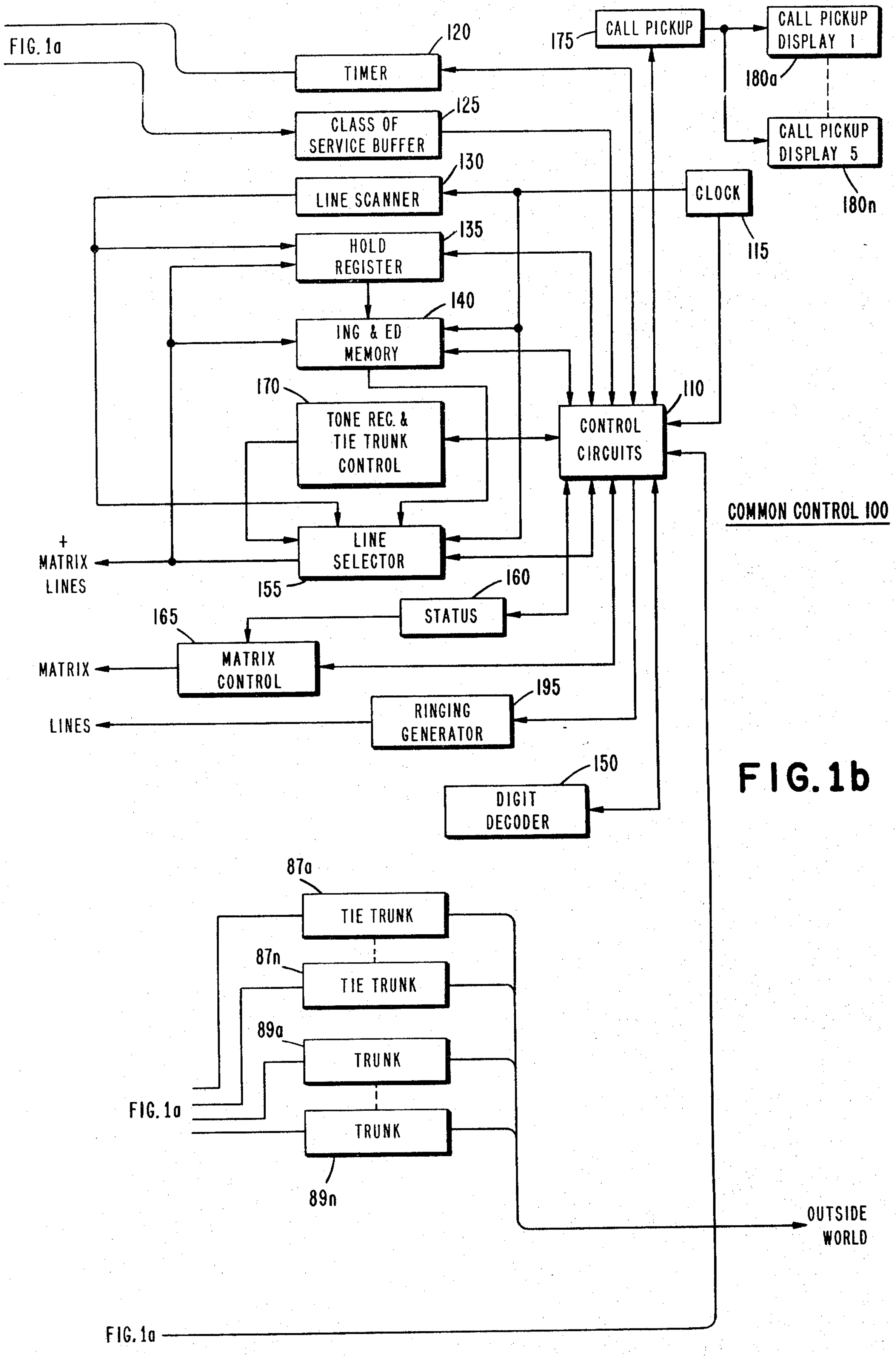

FIG. 1*b* schematically illustrates the various elements of the common control 100, the heart of which is formed by a plurality of control circuits 110 in the form of a hard-wired programmer. The timing of the various functions which are performed in the system under control of the control circuits 110 is regulated by the various timing signals produced by a clock 115, which is directly connected to the line scanner 130, which serves to generate the line scanning signals, and is connected through the control circuits 110 to the various other elements in the common control 100 to provide a time base for the various functions thereof.

A timer 120 is also provided in the common control 100 to analyze the information concerning the line conditions and other information from the junctor and perform memory timing functions within the system. For example, on-hook and off-hook timing, timeouts, flash detection and other conventional timing functions are performed by the timer 120. In this regard, the timer 120 operates with the control circuits 110 to perform whatever timing functions are necessary within the system.

A class of service buffer 125 forms an interface between the class of service programmer 47 and the logic circuitry of the common control 100. Thus, the various line conditions which are derived through the class of service programmer 47 each time a line is addressed will be passed to the control circuits 110 through the class of service buffer 125.

The line scanner 130 is driven from the clock 115 and serves to scan each of the lines in turn continuously to detect requests for service. In this regard, the lines are addressed by the line scanner in conjunction with the scanning of the junctors, a line being addressed from the line scanner at the end of each complete scan of all of the junctors, as will be described in greater detail in connection with line selection and matrix control operation. Each time a line is addressed by the line scanner 130, the calling bridge relay information within the line is forwarded via the common bus 32 and the class of service programmer 47 to the control circuits 110 in the common control 100 via the class of service buffer 125. In this way, the status of the line, i.e., whether or not it is requesting service of the system, is monitored during the continuous scanning of the lines by the line scanner 130.

A hold register 135 is provided as a temporary memory which is used for various systems operations in conjunction with information stored in conjunction with the various junctor circuits. As will be described in greater detail, the system stores the identity of the lines associated with any junctor during the entire duration of a call in the system, so that during the establishment of the communication connection between parties and in providing various functions requested by the parties during the call, it is necessary at various times to temporarily store information as functions are being performed within the system by the common control 100. The hold register 135 provides the temporary storage capability in the system.

The system includes a junctor memory 140 which forms the present invention and serves as the basic junctor memory portion for storing the calling and called numbers identifying the lines associated with each of the junctors. The memory 140 includes storage positions assigned to each of the junctors, which storage positions are continuously scanned by clock signals derived from the clock 115. Thus, if a junctor is associated with one or more lines, the scanning of the portion of memory 140 assigned to that junctor will produce the calling and/or called numbers of those lines which are stored therein. In this way, the identity of the crosspoints in the matrix 10 associated with the line or lines involved with the junctor can be identified.

A line selector 155 receives line designations from the line scanner 130 and from the junctor memory 140, and in response to the clock signals from the clock 115 selectively addresses crosspoints in the matrix 10 and selected lines at the proper times. In the solid state crosspoint matrix 10, addressing alone of the crosspoint will open the crosspoint, while addressing in combination with a positive request for actuation of the crosspoint will close the crosspoint. Whether or not the crosspoint is to be opened or closed is determined by the status of the call based upon the progress of the connection as determined by the control circuits 110 from the information derived from the lines via the class of service programmer 47 and class of service buffer 125. The system control progresses in states, with the individual states being monitored by the status circuit 160, which stores the state in which any particular call is in and advances under control of the control circuits 110 as the call progresses from one state to the next in a particular program. Thus, the information concerning the desired condition of the crosspoint, i.e., whether it is to be open or closed, is derived from the status circuit 160. If the crosspoint which is addressed from the line selector 155 is to be closed for a particular call, a matrix control 165 will receive information from the status circuit 160 to this effect and generate a positive request signal for closing of the crosspoints. If the crosspoints are not to be closed, the matrix control 165 will produce no output as the crosspoints are addressed, thereby effecting an automatic opening of the crosspoints.

A ringing generator 195 of any known form is provided for application of ringing current to the lines under control of the control circuits 110.

The digit decoder 150 performs analysis of the incoming digits and makes decisions concerning these received digits. For example, the digits received by the digit decoder 150 are analyzed for line-to-line calls, line-to-trunk calls, toll restrictions and other information. The information provided by the digit decoder 150 then serves to initiate various control functions within the control circuits 110 as the various states of the call progress.

As a special feature, the system also provides a transfer circuit 170 which effects transfer between lines and between trunks and lines, as may be required.

A further special feature is embodied in a call pickup arrangement including a call pickup circuit 175 and a plurality of call pickup displays 180*a* through 180*n*.

The function of the various elements of the system of the present invention will become clearer from a general description of various basic functions of the system.

BASIC SYSTEM OPERATION

The lines are continuously scanned from the line scanner 130 via the line selector 155 in the common control 100, so that a line circuit requesting service will ultimately be addressed permitting the state of the calling bridge relay in the line circuit to be passed on through the class of service programmer 47 along with class of service information concerning that line circuit to the common control 100. Assuming that the line circuit 15a has gone off-hook and is requesting service, this line will ultimately be addressed by the line selector when the line scanner 130 reaches this line in its scan of all of the lines. At the same time, the line selector 155 will also address all of the crosspoints of the matrix 110 associated with that line circuit. In this case, all of the crosspoints associated with the line circuit 15*a* along the first horizontal of the matrix including the crosspoint 12' will be addressed. If, as a result of some misoperation, one or more of these crosspoints has been inadvertently closed, the addressing of the crosspoints at this time will automatically open the crosspoints in the absence of positive control from the matrix control 165 indicating that one or more of these crosspoints should be closed. Since line 15*a* has just requested service, none of the crosspoints should be closed and therefore the status circuit 160 will provide no indication to the matrix control 165 that any of the crosspoints involved should be closed. In view of the fast scanning times provided within the system for scanning the lines and junctors, it can be seen that a misoperation of a crosspoint will be immediately corrected so that no effect upon any communication connection through the matrix will result, nor will such crosspoint misoperation be noticeable to either party except for a click as the crosspoint is opened or closed to correct the state thereof.

When the control circuit 110 receives an indication through the class of service buffer 125 that the line circuit 15*a* has requested service, the control circuits 110, which include a junctor allotter, will assign a free junctor to the line circuit and request that the calling line number of the line circuit 15*a* be stored in the junctor memory 140 in the time positioned assigned to the selected junctor. The control circuits 110 will also address the status circuit 160 to record in the memory thereof that the call associated with the selected junctor is in the first state of operation. Assuming that the junctor allotter in the control circuits 110 selects the local junctor 95*a* the calling line number of the line circuit 15*a* will be stored in the memory position of the junctor memory 140 permanently assigned to the local junctor 95*a*, and each time the junctors are scanned, the line number of the calling line 15*a* will be forwarded to the line selector so that the line 15*a* can be addressed at this time and the crosspoint associated both with the line 15*a* and the junctor 95*a*, i.e., the crosspoint 12′ can be addressed. The status circuit 160 indicates to the matrix control 165 that the call is in a state wherein the crosspoint 12′ should be closed, and therefore the matrix control 165 will forward a positive request for closing the crosspoint 12′ at the time the crosspoint is addressed. As a result, the line circuit 15*a* will be connected through the matrix 10 to the local junctor 95*a*.

At the same time that the crosspoint 12′ is addressed and closed to enable connection between the line circuit 15*a* and the local junctor 95*a*, the matrix control 165 under control of the status circuit 160 addresses the crosspoints of the tone matrix section of the matrix 10 associated with the dial tone generator 68 so that the crosspoint 12‴ will be closed connecting the dial tone generator 68 through the local junctor 95*a* to the line circuit 15*a*. The line circuit may then commence to dial the number of the party to which it desires connection.

The control circuits 110 in the common control 100 will advance the status circuit 160 of the particular junctor 95*a* to state 2 if the calling line circuit has rotary dial equipment or to state 3 if the calling line circuit has tone dial equipment, as determined from the class of service information for that line circuit received from the class of service programmer 47. Each time the junctor 95*a* is scanned, the number of the calling line circuit 15*a* will be provided by the junctor memory 140 to the line selector 155 which will address the line permitting the calling bridge relay state to be monitored via the bus 32 and class of service programmer 47 in the common control 100. The digit decoder 150 will accumulate the calling bridge relay states and provide to the control circuits 110 the digit information which will be stored in the memory portion of the junctor memory 140 assigned to the junctor. Eventually, the junctor memory 140 will have stored in the portion thereof assigned to the junctor 95*a* both the calling and called line numbers.

When it is determined by the timer 120 that the calling line 15*a* has completed dialing, the control circuits 110 will advance the status circuit 160 to record state 4 in the position of the memory thereof assigned to the junctor 95*a*. State 4 relates to busy test of the called line circuit. If the called line circuit is found to be busy, the tone matrix section of the matrix 10 is once again addressed from the matrix control 165 to connect busy tone from the generator 68 through the local junctor 95*a* to the calling line circuit 15*a*. On the other hand, if the called line circuit is free, the control circuits 110 will advance the status recorded in status circuit 160 to state 5 for application of ringing from the ringing generator 195 to the called line circuit and to address the tone matrix section of the matrix 10 to connect the ring back tone generator 78 through the local junctor 95*a* to the calling line circuit 15*a*.

The matrix control 165, upon receiving the calling and called line numbers from the junctor memory 140 as the junctor 95*a* is scanned, will address the crosspoint 12′ and also the crosspoint associated with the called line, for example, crosspoint 12″ associated with the line 35*a*. Thus, when the called party answers in response to the applied ringing, he will be connected via crosspoints 12′ and 12″ in the matrix 10 to the calling party, and the respective line circuits 35*a* and 15*a* will receive ground to maintain crosspoint bias, as described in connection with FIG. 3, from the local junctor 95*a* during the duration of the call. At this time, the status circuit 160 is advanced by the control circuits 110 to status 7, indicating to the system that a local call is in progress.

Where the lines are equipped with tone dial equipment, this class of service for the line circuit is indicated to the common control by the class of service programmer 47. In this regard, the class of service programmer 47 typically includes a panel having selected class of service plugs so that the features of the system may be allocated on a per line basis and the information with respect thereto may be provided to the common control. Thus, in addition to providing a path for the calling bridge relay information from the lines, the class of service programmer 47 also submits at this time class of service data concerning the particular line for use by the common control 100.

When a call is in state 3 indicating dialing from tone dial equipment, the common control 100 effects connection via the matrix between the calling line and an available one of the tone receivers 40*a* through 40*n*. The tone receiver converts the tone dial into the corresponding binary number, which is received by the common control 100 and placed into the junctor memory 140.

Since the operator loop circuits 60*a* through 60*n* are merely provided as line appearances at the input of the matrix 10, the functions associated with the operator position are greatly simplified. Because of the fast switching capability of the crosspoints in the matrix 10, the split functions normally associated with incoming connections to the operator may be performed with the matrix crosspoints. Thus, special trunk circuits having separate operator access with split tip and ring pairs, as normally required in conventional systems, are not required in the system of the present invention. In addition, since the split functions are performed in the present system within the matrix 10 by selective operation of the crosspoints, the operator loop circuits and position circuits which normally control such functions can be greatly simplified. Since the operator loop circuits are effectively line circuits in the present system, switching a trunk to a line or to an operator is the same function for the system. This makes it also possible to greatly simplify the loop circuits.

In outgoing trunk calls, it is necessary for the system to switch from a local junctor to a trunk junctor. In this regard, the line circuit is initially connected to a local junctor upon detection of the request for service in the manner described above by closing the crosspoint in the matrix 10 common to the line circuit and a selected available local junctor. In the foregoing example, by closing crosspoint 12′, the line circuit 15*a* can be connected to the local junctor 95*a*. An addressing of the tone matrix section provides connection of the dial tone generator 68 through crosspoint 12‴ and the local junctor 95*a* to the line circuit 15*a*. When dialing commences, the crosspoint 12‴ is released disconnecting dial tone from the line circuit and the dialing impulses are received in the common control 100 via the class of service programmer 47. The digit decoder 150 for outgoing trunk calls will recognize the first digit as a request for access to a trunk circuit and the control circuits 110 will indicate the need to connect to a trunk junctor. The junctor allotter in the control circuits 110 will select an available trunk junctor, for example, junctor 85*a* connected to the trunk 89*n*.

As can be seen, many different functions can be performed during the time in which a junctor is being scanned through selective control of various crosspoints within the matrix 10 under control of the common control 100 during designated time slots of the junctor scan period, as will be described in greater detail in connection with the system timing.

SYSTEM TIMING

Figure 2C:
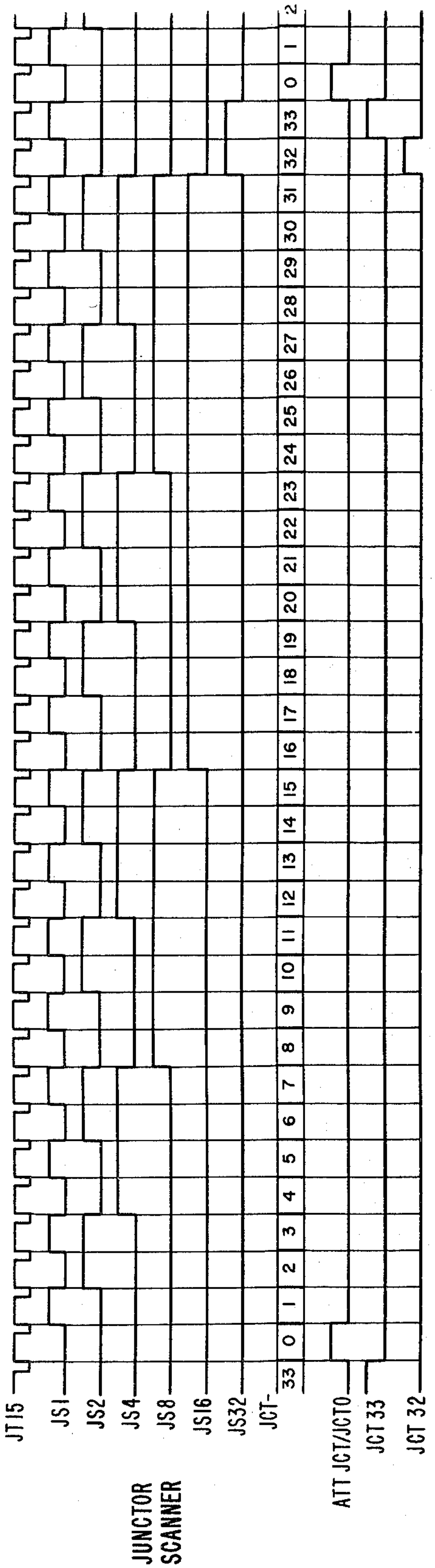
Figure 2A:
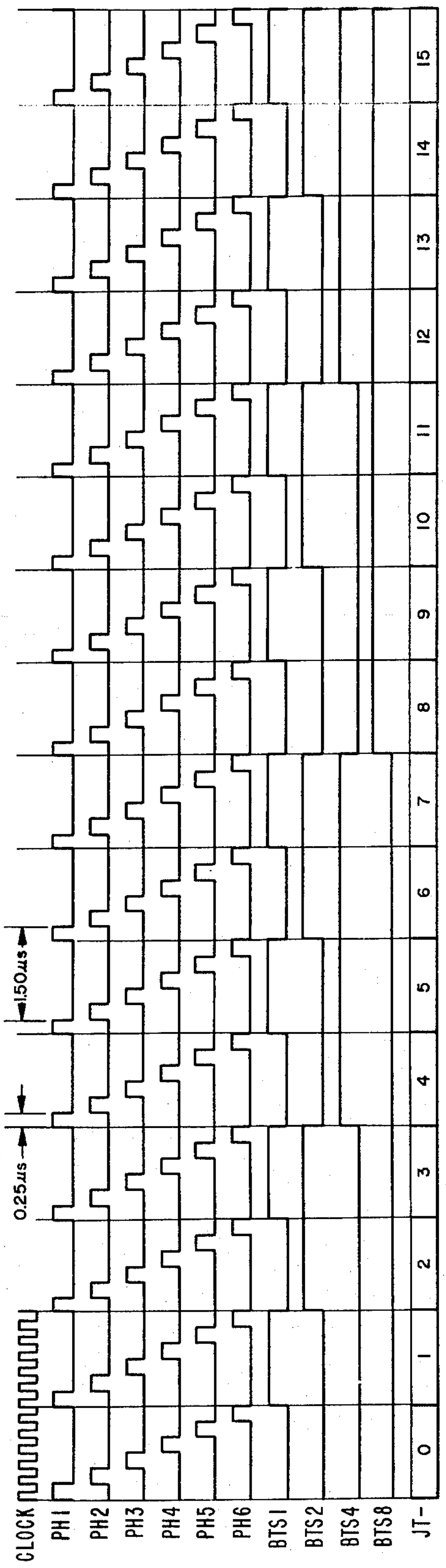
Figure 2B:
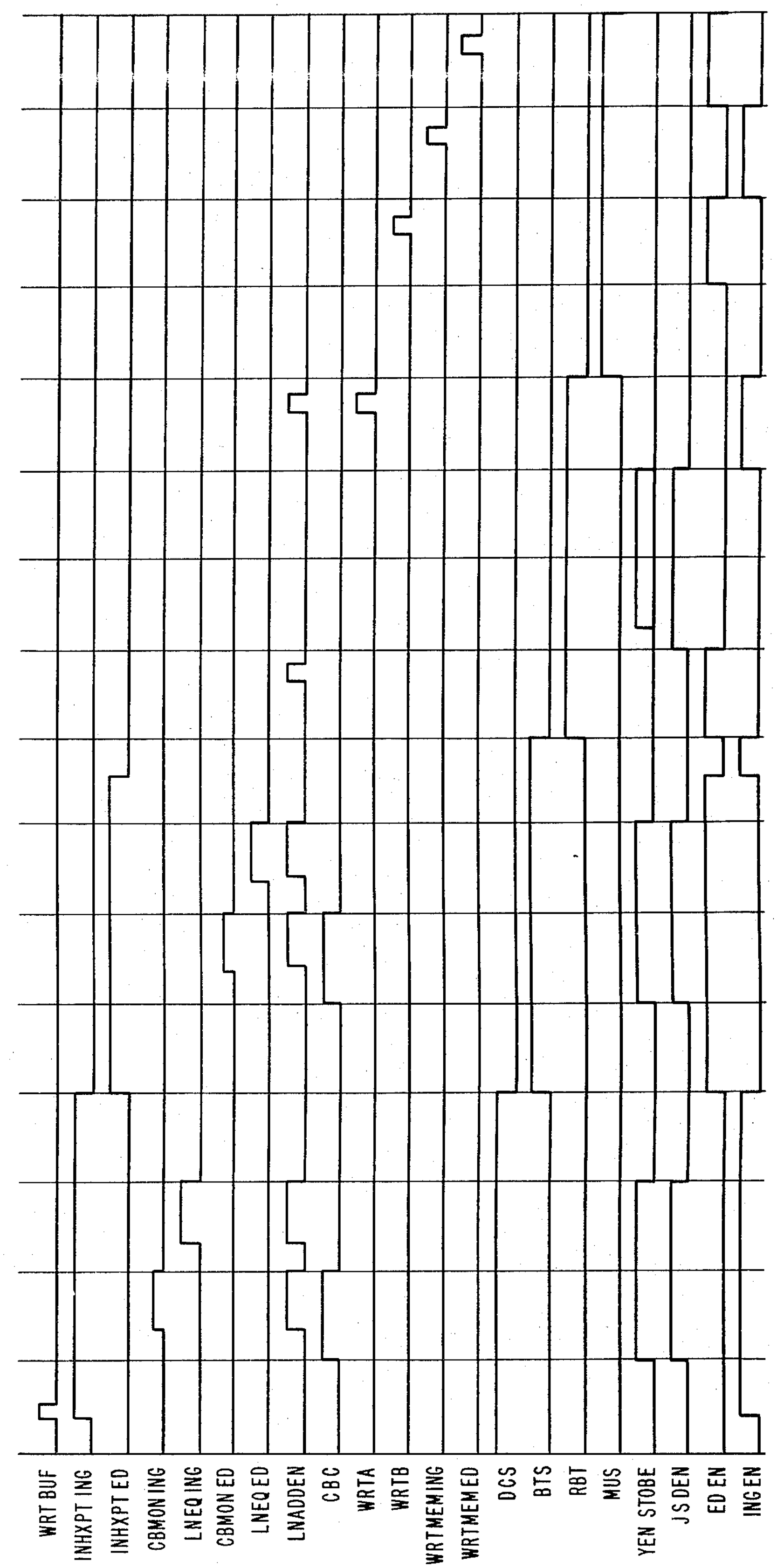

The system timing is controlled by the clock 115 in the common control 100 on the basis of various clock signals such as presented in FIGS. 2*a* through 2*c*. Typically, the clock includes a 4 MHz crystal oscillator connected to a divider chain and various decoders to produce the required clock signals for controlling the various elements of the system.

As already indicated in the general system description, the junctor memory 140 forming the present invention includes a storage position for each of the junctors in the system and this memory is recirculated so that the information stored in each junctor position is scanned successively during a recurring time frame. In the exemplary system disclosed in this application, 32 junctors are connected to the output of the matrix 10, so that the junctor memory 140 will include 32 junctor positions. In addition, the junctor memory 140 also includes positions 32 and 33 which represent time periods during which a scanning of the lines is effected. Thus, after all junctors have been scanned, the line number designated by the line scanner 130 will be addressed during the 32 and 33 junctor positions to determine whether there is a request for service in connection with that line. Thus, at the end of each 32 time position, the line scanner 130 will be advanced to the next line, with the result that the lines are scanned one at a time at the end of each complete scan of the junctors.

Each junctor time position is subdivided into junctor time slots during which the various functions required in connection with the call associated with the junctor are performed under control of the control circuit 100. During one or more of the time slots of each junctor time, one or more functions may be performed by various elements of the common control as required by the state of the call under control of the control circuits.

The clock 115 is typically formed by a crystal oscillator connected to a divider chain and various decoders to produce the clock signals required for controlling the functions to be performed within the system. FIG. 2*a* illustrates the output of a 4 MHz crystal oscillator from which phase signals PH1 through PH6 are derived by a clock phase generator producing a division by six of the basic frequency. The output of the clock phase generator is connected to a bit time slot counter effecting a division by 16 to produce the binary bit time slot signals BTS1 through BTS8. A decoding of the four bit binary time slot signals produces the 16 junctor time slot signals JT0 through JT15.

Further decoding of the binary bit time slot signals BTS1 to BTS8 also produces various timing signals which are utilized throughout the system. These timing signals which will be utilized in the various common control circuits to be described are illustrated in FIG. 4*b* in relation to the 16 junctor time slot signals JT0 through JT15. The function of these timing signals will be described in connection with the description of the detailed operation of the various common control elements.

FIG. 2*c* illustrates the waveforms which are derived from the junctor scanner portion of the clock. A further division by 34 produces the junctor scan signals JS1 through JS32. A decoding of these junctor scan signals then produces the junctor signals JCT0 through JCT33. Additional decoding produces the signal ATT JCT which represents the junctor 0 position, as well as the junctor 32 and junctor 33 signals JCT32 and JCT33.

JUNCTOR MEMORY

Figure 3:
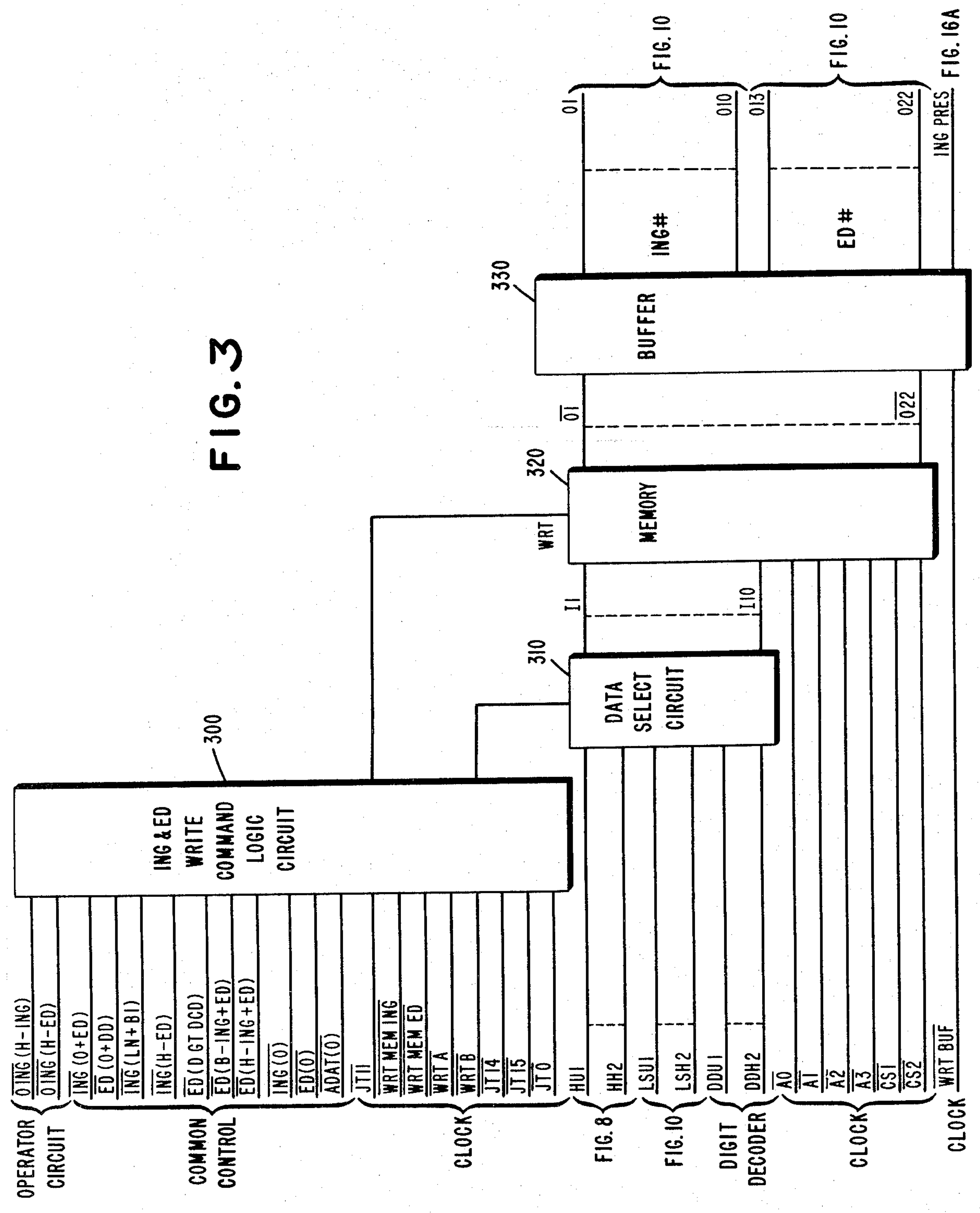
FIG. 3 is a schematic block diagram of the junctor memory of the present invention.

As seen in FIG. 3, the junctor memory 140 includes a write command logic circuit 300 which receives various command signals from the control circuits 110 along with junctor time slot signals from the clock, and in turn controls the storage and read out of data into and out of a memory 320. The logic circuit 300 receives various command signals for storage of calling and called line numbers in designated locations of each junctor memory portion, which logic signals serve to control a data select circuit 310 receiving line numbers from the hold register on binary inputs HU1 through HH2, from the line selector on binary inputs LSU1 through LSH2, and from the digit decoder on binary inputs DDU1 through DDH2. In accordance with the commands applied to the logic circuit 300, the line numbers from the hold register, line selector, and digit decoder are gated to the memory 320 on leads 11 through 110 and stored in the memory 320 upon generation of the write command signal WRT from the logic circuit 300.

The commands received from the operator and the control circuits 110 relate to the storing of the calling and called numbers in the proper locations of each junctor portion of the memory. The command $\overline{\text{0ing}}$ (H→ing) indicates that the calling number from the hold register is to be stored in the ing number location of the junctor portion of the memory. Similarly, the command $\overline{\text{0ing}}$ (H—ed) indicates that the called number from the hold register is to be stored in the ing location associated with the attendant junctor. The command $\overline{\text{ing}}$ (0+ed) indicates placing the ed number from the operator in the ing register. The command $\overline{\text{ed}}$ (0+ed) indicates a request to place the ed number from the operator in the called portion of the memory. The command $\overline{\text{ing}}$ (LN+D1) indicates that the line number from the buffer is to be placed in the calling portion of the memory. The command $\overline{\text{ing}}$ (H→ed) indicates that the called number from the hold register is to be placed in the calling portion of the memory. The command $\overline{\text{ed}}$ (DDT DCD) indicates that the number from the digit decoder is to be placed in the called portion of the memory. the command $\overline{\text{ed}}$ (B→ing + ed) indicates that the calling and called line numbers from the buffer are to be inserted in the called portion of the memory. The command $\overline{\text{ed}}$ (H→ing + ed) indicates a request that the calling and called numbers from the hold register are to be placed in the called portion of the memory. The command $\overline{\text{ing}}$ (0) indicates that the number in the calling portion of the memory is to be zeroed. The command $\overline{\text{ed}}$ (0) indicates that the number in the called portion of the memory is to be zeroed. The command $\overline{\text{ADAT (0)}}$ indicates that all data is to be zeroed.

The signals from the clock represent the various junctor time slots during which the various commands are to be executed. The clock also provides the binary signals A0 through A3, CS1 and CS2 which represent the memory addresses of the junctor portion corresponding to the junctor times JCT0 through JCT 32. These junctor signals control the circulation of the data within the memory 320 so that in combination with the junctor time slots applied from the clock to the logic circuit 300, the data will be inserted into the proper junctor portion of the memory during the proper time.

The output of the memory 320 is provided on leads $\overline{01}$ through $\overline{022}$ to a buffer store 330, which provides binary outputs 01 through 010 representing the calling number and binary outputs 013 through 022 representing the called number to the line selector. A further output "ing pres" to the control circuits 110 indicates that the calling number is present and the output "0 ing pres" indicates that the calling number is present in the memory portion to the operator complex.

As can be seen, the junctor memory basically provides for a memory storage position for each junctor in the system including a junctor position 32 for receiving the line number from the line scanner which is to be addressed for purposes of determining whether a request for service is present. In each memory portion associated with a particular junctor, the calling and called numbers will be stored depending upon the state of the call so that the system may determine each time a junctor is addressed which line circuits, if any, are involved in a call under the control of that particular junctor.

Figure 4:
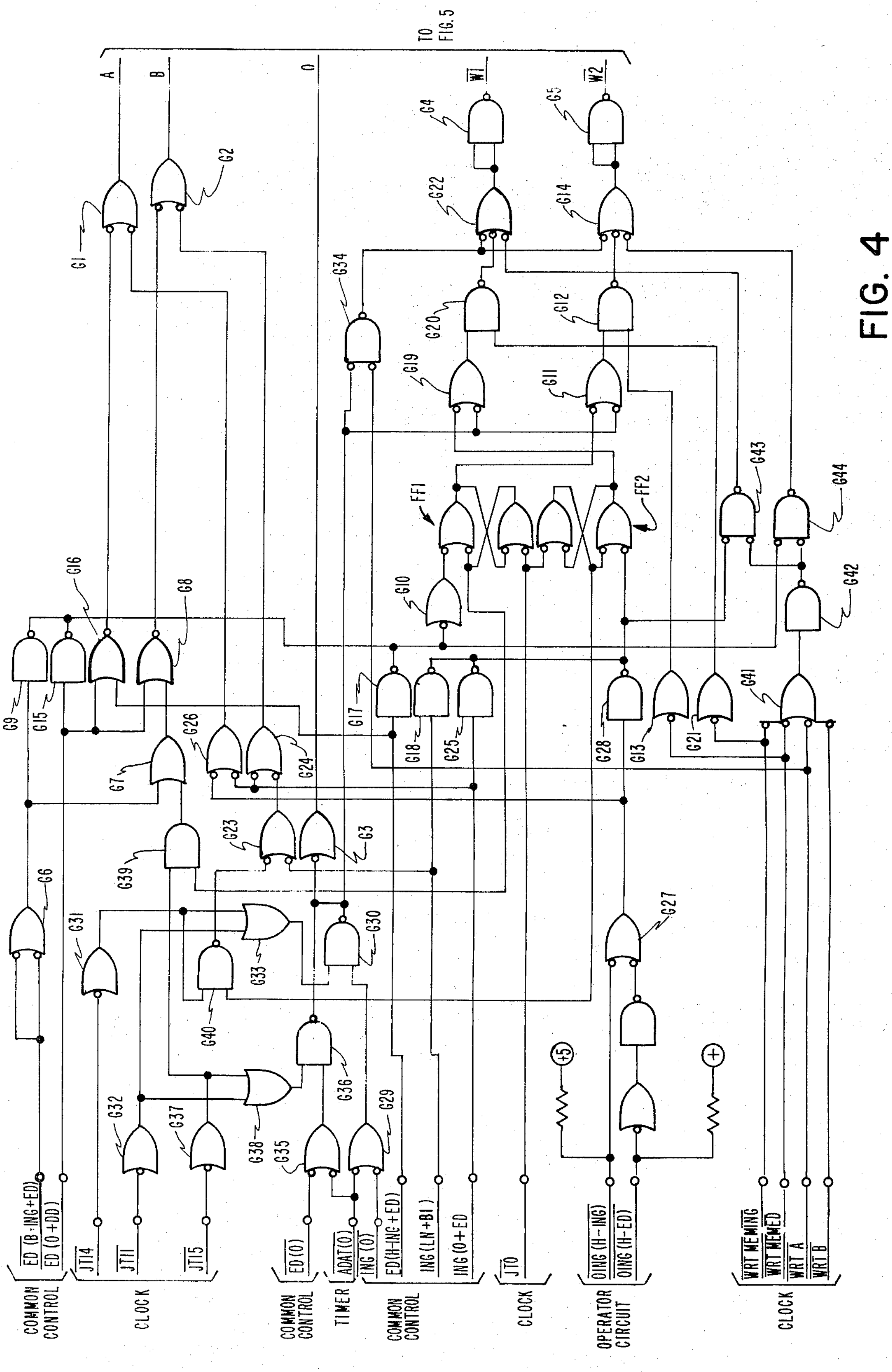
FIG. 4 is a schematic circuit diagram of the write control.

FIG. 4 illustrates in detail the write control circuit 300, which has three basic functions. First of all, the circuit 300 provides outputs to the data select circuit 310 to selectively gate line numbers either from the hold register, the line selector or the digit decoder to the memory 320. Secondly, an output is provided to the memory to erase certain data stored therein by zeroing the data at selected locations. The third function of the control circuit 300 is to provide write control signals to the memory to control the timing of the read and write operations.

The outputs A and B from the gates G1 and G2 in FIG. 4 control the data select circuit 310 to selectively gate the outputs from the hold register, line selector and digit decoder to the memory. While any binary combination may be used to selectively control the application of data from these three sources to the memory, it may be provided that data from the hold register will be applied to the memory through the data select circuit 310 when the signal A is "1" and the signal B is "0". Similarly, data from the line selector may be applied through the data select circuit 310 when the signal A is 0 and the signal B is 1 and data from the digit decoder may be applied to the memory through the circuit 310 when both the signals A and B are 1.

The output from the control circuit 300 which serves to erase data in the memory is the O output and the outputs which serve to control the timing of the write operation in the memory are the signals $\overline{W1}$ and $\overline{W2}$, as seen in FIG. 4. Each of the command signals received from the common control are applied via various logic gates to provide one or more of the three output controls from the circuit 300, the control outputs each being provided at specific times under the control of various clock signals received from the clock system.

As already indicated, the command $\overline{ED}$ (B→ing + ed) indicates a transfer of the calling and called line numbers from the buffer in the line selector to the called portion of the memory. Thus, this signal will be applied via OR gates G6, G7 and G8 to an input of the OR gate G2, so that the output B will be 1. The output A from gate G1 remains 0 so that the data select circuit 310 will receive an indication that data from the line selector is to be transferred to the memory. At the same time, the output from gate G6 is applied via gate G9 and OR gate G10 to set flip-flop FF1 whose output will be applied via gate G11 to one input of AND gate G12. The other input of AND gate G12 is the timing signal $\overline{\text{WRT MEM ED}}$ from the clock system applied via gate G13 so that an output will be provided from the gate G12 at the time when data is to be inserted into the called portion of the memory. The output from gate G12 is applied via gate G14 to gate G5 so that the output $\overline{W2}$ can be forwarded to the memory to control the write operation.

The command $\overline{\text{ED 0 + DD}}$ indicates a request to place the output of the digit decoder in the called portion of the memory. Thus, the output of gate G15 will be applied via gate G10 to set the flip-flop FF1 so as to provide the write control signal $\overline{W2}$ in the manner indicated in the above-mentioned operation. However, in this case the data is to be read into the memory from the digit decoder, and therefore an output is provided from the gate G16 to enable gate G1, providing an output A of 1. The same signal is applied through gate G8 to enable gate G2 so that the signal B is also 1. Thus, the data select circuit 310 is controlled to apply data from the digit decoder to the memory.

The command ED (H→ing+ed) provides for a transfer of the calling and called numbers from the hold register to the called portion of the memory. This command results in enabling of the gates G16 and G17 providing an output A from gate G1 at the level 1 and setting the flip-flop FF1 via gate G10 to provide the write command signal $\overline{W2}$.

The command ING(LN+B1) provides for a transfer of the line number from the buffer of the line selector in the calling portion of the memory. This command enables gate G18 to set flip-flop FF2, whose output is applied via OR gate G19 to the AND gate G20. The other input of AND gate G20 is the timing signal WRT MEM ING from the clock system applied via gate G21 so that enabling of the gate G20 at the proper time for writing data into the calling portion of the memory will result in a generation of the write control signal $\overline{W1}$ via gates G22 and G4. This command will also enable gates G23 and G24 to provide the output B of gate G2 at a level 1 while the output A of gate G1 remains 0. Thus, the data select circuit 310 will be controlled to apply data from the line selector to the memory.

The command ING(0+ed) provides for a placing of the called number from the operator appearing at the output of the digit decoder in the calling portion of the memory. Thus, gate G25 will be enabled to set flip-flop FF2 thereby providing the write command signal $\overline{W1}$ via gates G19, G20, G22, and G4 at the proper time, as already described. In addition, gates G24 and G26 will be enabled so that the outputs A and B from the gates G1 and G2 will both be at a level 1 to control the data select circuit 310 to transfer data from the digit decoder to the memory.

The two commands 0ING(H→ing) and 0ING(H→ed) from the operator complex are applied via gates G27 and G28 to set the flip-flop FF2, which produces the write command signal $\overline{W1}$ via gates G19, G20, G22 and G4. Gate G26 is also enabled by the output of gate G27 so that the output A from gate G1 will be at a level 1, indicating to the data select circuit 310 transfer of data from the hold register to the memory.

The commands ING(0), ED(0) and ADAT(0) provide for zeroing of the calling number, zeroing of the called number and zeroing of all data, respectively. The signals requesting zeroing of the calling number and zeroing of all data are applied through OR gate G29 to one input of AND gate G30. The other input of AND gate G30 is controlled by the junctor timing signals JT11 and JT14 via gates G31, G32 and G33, so that at the proper junctor time slots, an output will be provided from AND gate G30 to enable OR gate G3 to provide the command signal "O" to the memory. At the same time, the output of gate G30 is applied to one input of AND gate G34, the other input of which is the clock signal WRTA. The clock signal at the output of gate G34 will be applied through gate G22 and gate G4 as the write command signal $\overline{W1}$. The command for zeroing all data as well as the command for zeroing the called number are applied through the gate G35 to one input of the AND gate G36. The other input of the AND gate G36 receives the junctor timing signals JT11 and JT15 to enable the gate during the proper junctor time slots. The output from gate G36 enables gate G3 as well as gate G34 in the manner already described. Thus, the output from gate G30 will effect a zeroing of the calling number and an output from the gate G36 will effect a zeroing of the called number. Both of these gates are enabled upon receipt of the signal $\overline{\text{ADAT (0)}}$. The outputs from gates G30 and G36 are also applied to the OR gates G11 and G19 so as to simulate enabling of the flip-flops FF1 and FF2, respectively. Thus, the clock control signals applied to the AND gates G12 and G20 for controlling the write function of the memory for the calling and called data stored therein are effected in the manner described above.

Figure 5:
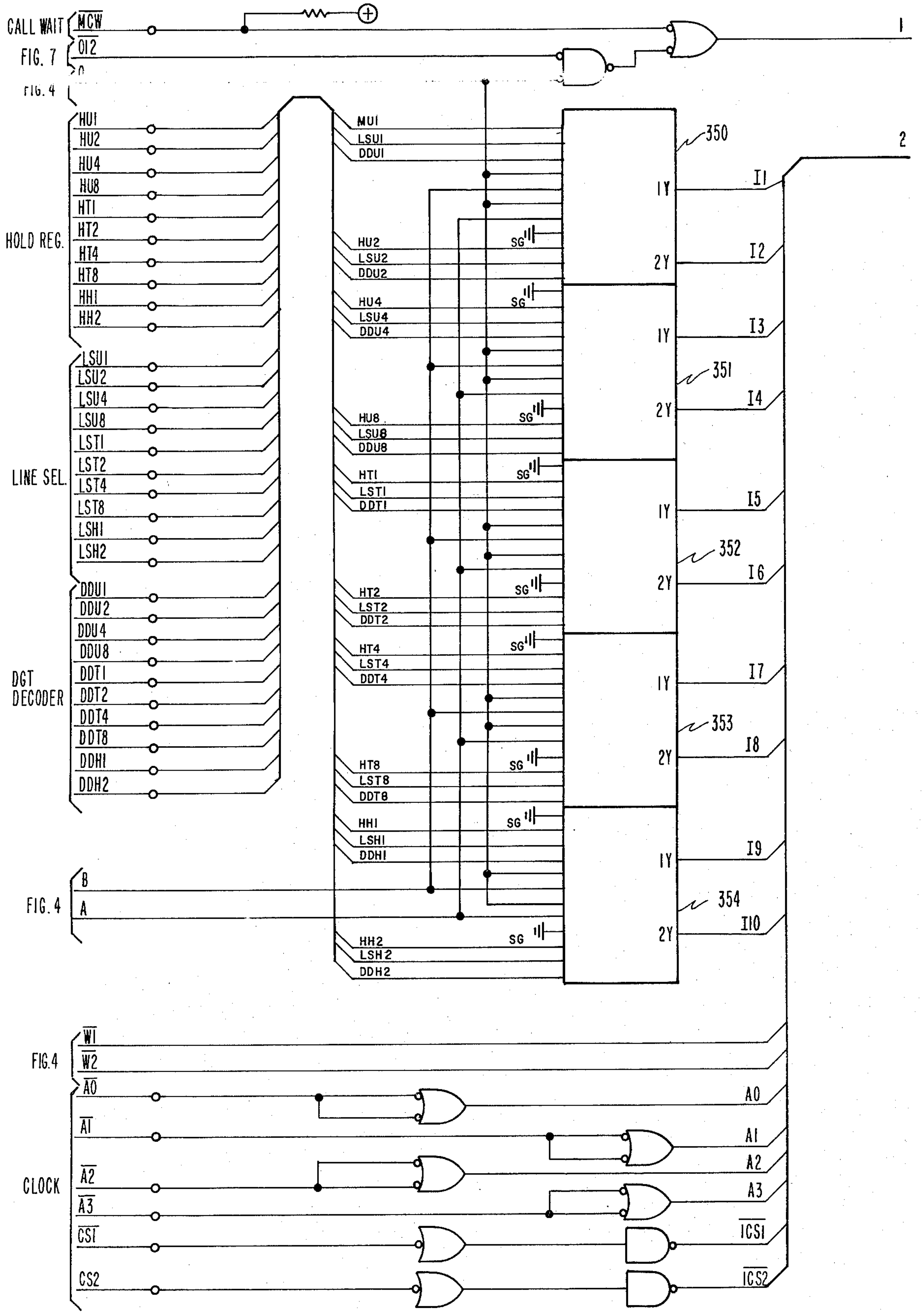
FIG. 5 is a schematic circuit diagram of the data selector.

FIG. 5 illustrates the general circuit arrangement of the data select circuit 310, which includes a plurality of switches 350 through 354. The switches may take any conventional form capable of switching three inputs to one selected output; however, in the example illustrated in FIG. 5, each of the switches is a double unit receiving two of the respective inputs from each of the hold register, line selector and digit decoder. The switching control signals A and B from FIG. 4 are applied to each switch combination and serve to control the application of the inputs from one of these three sources to the output of the switch in the manner already described. The zero command signal O is applied to the ground inputs of each of the switches and serves to disable the switches so as to prevent application of any data through the switches to the memory.

Figure 6:
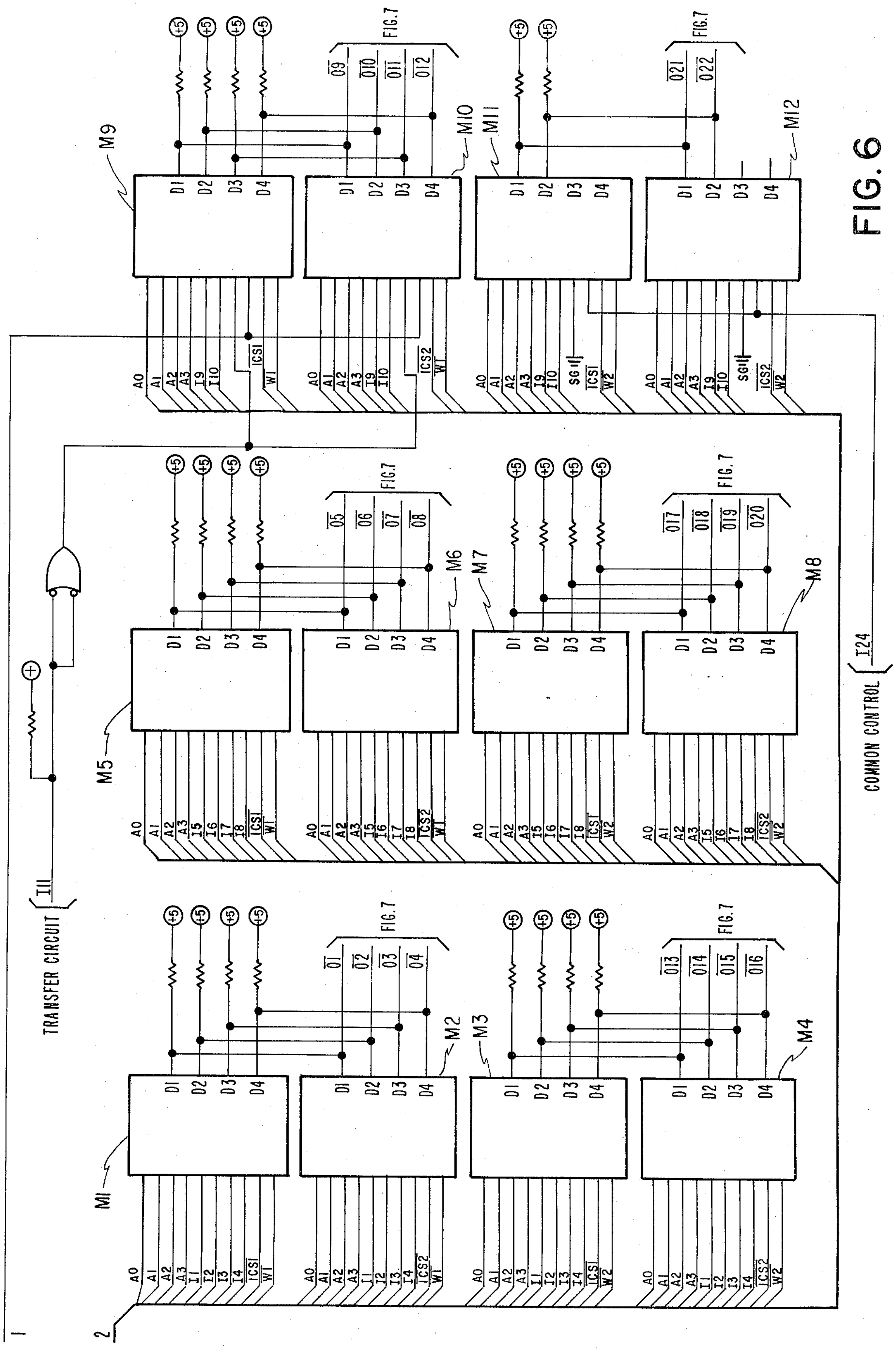
FIG. 6 is a schematic circuit diagram of the memory.

FIG. 6 is a circuit diagram of the junctor memory, which is made up of a plurality of memory chips M1 through M12. As noted from the foregoing description, the write command signal $\overline{W1}$ controls the calling portion of the memory and is applied to the memory chip pairs M1–M2, M5–M6, and M9–M10, which serve as the storage locations for the calling line numbers. Similarly, the write command signal $\overline{W2}$ serves to control the called line portion of the memory formed by the memory chip pairs M3–M4, M7–M8, and M11–M12.

The timing signals A0, A1, A2, A3, CS1 and CS2 are timing signals corresponding to the respective junctor times. These timing signals are applied to the memory chips so that a scanning of the junctor positions in the memory is effected in a sequential manner similar to a recirculating delay line.

Figure 7:
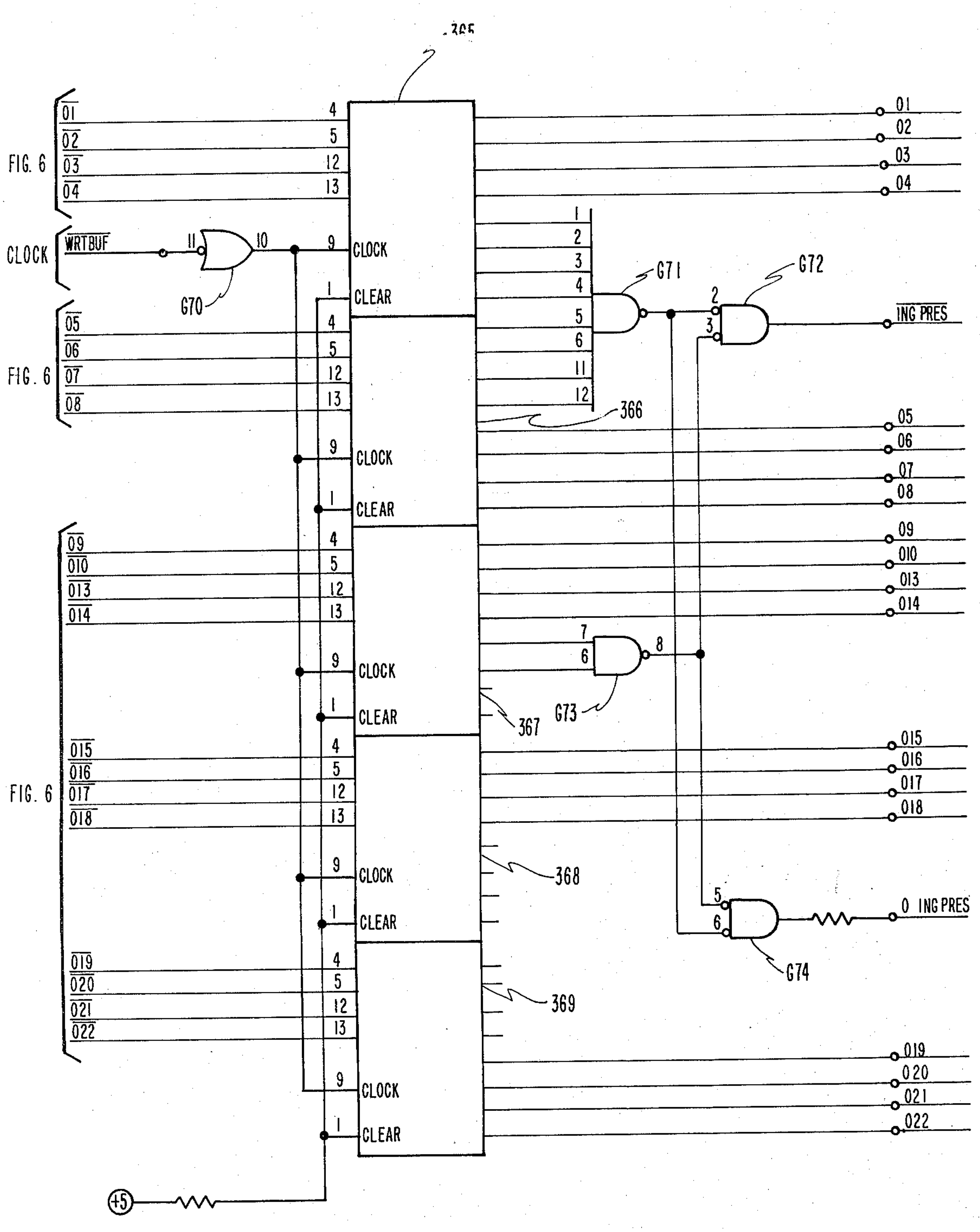
FIG. 7 is a schematic circuit diagram of the memory buffer.

FIG. 7 is a circuit diagram of the buffer 330, which consists principally of a number of flip-flop units 365 through 370 which serve to store the outputs $\overline{01}$ through $\overline{022}$ from the memory 320 upon application of the write control signal $\overline{\text{WRT BUF}}$ via gate G70. The outputs of the buffer units 365 through 370 representing the stored calling and called data may be obtained directly as outputs 01 through 022, while certain outputs from the buffer units are combined by various logic gates to produce certain command signals required in the system.

For example, the outputs of gates G71 and G73 combine to enable gate G72 to provide the signal $\overline{\text{ING PRES}}$ indicating that the calling party is present. A similar signal is provided at the output of gate G74 to the operator complex to indicate that the calling party is present.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. In an electronic private automatic branch exchange having a plurality of line circuits and junctors, switching means for selectively connecting one or more line circuits to a selected junctor, a digit decoder, a hold register and a line selector, the improvement consisting of a junctor memory system comprising a memory having a plurality of storage locations, clock means connected to said memory for sequentially scanning said storage locations during respective junctor times, gating means for selectively gating data to said memory from a selected one of said digit decoder, hold register and line selector, logic control means responsive to said clock means and selected command signals for actuating said gating means, and means responsive to the data stored in said memory for controlling said switching means.

2. A junctor memory system as defined in claim 1 wherein said memory comprises a plurality of individually addressable memory units connected to said clock means so as to be sequentially scanned.

3. A junctor memory system as defined in claim 2 wherein said logic control means includes command responsive means for selectively generating a binary combination of gating signals to control operation of said gating means in response to selected command signals.

4. A junctor memory system as defined in claim 3 wherein said logic control means includes memory write control means responsive to said selected command signals and said clock means for generating write command signals for control of said memory during selected times within said junctor times.

5. A junctor memory system as defined in claim 4 wherein said logic control means includes zero command means responsive to selected command signals for applying a zero command request signal to said gating means and said memory to zero the data in a selected storage location.

6. A junctor memory system as defined in claim 4 wherein said memory write control means is connected to said clock means so as to generate first and second write command signals during respective portions of each junctor time, said memory units being divided into a first group responsive to said first write command signal for storing calling line information and a second group responsive to said second write command signal for storing called line information.

7. In an electronic private automatic branch exchange including a plurality of line circuits and junctors, switching means for selectively connecting one or more line circuits to a selected junctor and a plurality of sources of data to be stored, a junctor memory system comprising a memory formed of a plurality of individually addressable memory units, clock means connected to said memory for sequentially scanning said memory units during each of a plurality of time periods of a repetitive time frame, gating means for selectively gating data from one of said plurality of sources to said memory, logic control means responsive to said clock means and selected command signals for actuating said gating means and controlling said memory to effect storage of data from one of said sources during selected time periods as designated by said command signals, and means responsive to the data stored in said memory for controlling said switching means.

8. A junctor memory system as defined in claim 7 wherein said logic control means includes command responsive means for selectively generating a binary combination of gating signals to control operation of said gating means in response to selected command signals.

9. A junctor memory system as defined in claim 7 wherein said logic control means includes memory write control means responsive to said selected command signals and said clock means for generating write command signals for control of said memory during selected times within said junctor times.

10. A junctor memory system as defined in claim 9 wherein said memory write control means is connected to said clock means so as to generate first and second write command signals during respective portions of each junctor time, said memory units being divided into a first group responsive to said first write command signal for storing calling line information and a second group responsive to said second write command signal for storing called line information.

* * * * *